Patented Nov. 21, 1939

2,180,543

UNITED STATES PATENT OFFICE 2,180,543

CASEIN GLUE

George H. Osgood, Tacoma, Wash.

No Drawing. Application April 26, 1938,
Serial No. 204,349

5 Claims. (Cl. 134—23.9)

This invention relates to improved glues comprising the combination of an additive aldehyde compound with a protein capable of being waterproofed or insolubilized by the aldehyde component of the additive aldehyde compound. The additive aldehyde compound in such glues maintains the aldehyde component in an inactive, latent or potential form and later, at the proper time, it is liberated and made active. While my new glues may be adapted to other uses, they are intended primarily for gluing together plies of wood veneer in the commercial manufacture of multi-ply veneer boards or panels. Glues of this type are known and usually require and contain an alkaline medium.

The protein

The protein I propose to use is milk casein which is commercially isolated from cow's milk. The casein is a market commodity obtainable as such; and this commercial material is capable of being insolubilized or waterproofed, or of having its water-resistance increased, for example, by aldehyde.

The waterproofing agent

As examples of the inactive or latent agents for waterproofing or insolubilizing the protein or making it more water-resistant, I may mention compounds of the group such as are referred to in the Craver Patent No. 1,373,412, granted April 5, 1921; my Patent No. 1,950,060, granted March 6, 1934; and Bernthsen-Sudborough on Organic Chemistry, 1926, pages 130 to 132—Additive Compounds of Aldehydes—wherein are disclosed sodium formaldehyde sulphoxylate, and any aldehyde bisulphite such as formaldehyde bisulphite, acetaldehydebisulphite, benzaldehyde bisulphite and the like, and aldehyde ammonias. While formaldehyde ammonia is effective, hexamethylenetetramin is apt to be decomposed too quickly into formaldehyde and ammonia by the alkali present in the glue even without the application of heat, since glues of the type referred to above usually contain alkali in some form. Any composition which ordinarily does not evolve aldehyde at room temperature, but does so in the presence of water and alkali, may be used in practicing my invention. Aldehyde sulphoxylates, aldehyde ammonias, and aldehyde bisulphites are well adapted for my purpose, because they are almost invariably decomposed when treated with alkalis or acids and liberate or regenerate the aldehyde, which characteristic has commonly been used for the separation of aldehydes from mixtures. Such compounds are thus a potential or latent source of aldehyde, by the use of which the development of the aldehyde may be controlled by the application of my invention, so that the protein will be reacted on thereby at the right time. I generally prefer sodium formaldehyde bisulphite for commercial use; although any suitable materials may be used alone or together as desired. The formaldehyde bisulphite may be prepared by mixing twelve pounds fifteen ounces (12 lbs. 15 oz.) of sodium acid sulphite (NaHSO₃) with eight pounds seven ounces (8 lbs. 7 oz.) of a commercial forty percent (40%) formalin solution in fifteen pounds (15 lbs.) of water. Such a formaline solution contains forty percent (40%) by volume and thirty-seven percent (37%) by weight of formaldehyde in water. The resulting solution may be used as such or it may be evaporated to dryness. This is the formaldehyde bisulphite solution hereinafter referred to. Other additive aldehyde compounds may be substituted for the formaldehyde bisulphite in such amounts as to supply the same amount of the aldehyde group radical, but I generally prefer sodium formaldehyde bisulphite for commercial use.

Glue characteristics

In the gluing of wood, and particularly the manufacture of multi-ply veneer boards or panels, hereinafter designated "panels", certain glue characteristics are important. Some of these are: the dry strength, which is the strength of the glue after the wood plies have been glued together into a completed panel and drying out the assembly; the wet strength, which is the strength of the glue when such panel has been exposed to a great amount of moisture as by soaking the panel in water for forty-eight (48) hours; the working life, which is the length of time that the glue after being made ready for application will remain usefully applicable to the work; the ability to take up and retain moisture and thus prevent it from going into and moistening the wood to too great a degree; the degree to which the glue in the finished panel is water resistant or waterproof; and there may be other valuable glue characteristics as well.

The strength of the glue, both wet and dry, should be such that the glue should not furnish points weak enough to fail under any stresses or strains to which the panel is to be subjected, and the theoretical optimum condition is to have the strength of the glue line in the completed panel at least as great or even greater than that of the wood under all conditions to which the panel may be subjected.

It is desirable that glues used in the manufacture of such panels, and in other laminating arts as well, set within a short period of time after being applied to the work. It is also desirable that they do not set too soon, that is before being applied, either completely or even partially, and that they do not become too viscous or otherwise assume a condition which prevents proper application to the work or too early a development of adhesiveness. Manufacturers of veneer panels prefer to make up a large batch of glue for continuous use, rather than to be compelled, because the working life is too short, to make up small batches of glue one after another.

Glues of the type above referred to, namely, those containing an additive aldehyde compound and commercial milk casein, have the great disadvantage that the glue when made up for application to the work becomes too stiff so quickly that it is frequently undesirable for use in commercial manufacture of panels. In other words, if present in sufficient proportion, the latent or potential waterproofing agent is too effective and not sufficiently latent to be the best possible for commercial manufactuing conditions. As a consequence, glues of this ype have not been used extensively, and where they have been used it has been necessary to have present only such a small amount of the additive aldehyde compound that the full waterproofing effect has not been achieved in the finished panels.

The invention

The prime objects of this invention are: to make possible the presence of a greater amount of the additive aldehyde compound than was previously possible, to modify prior glues of the type referred to in order to avoid disadvantages previously inherent thereto, to provide glues of the type referred to which have the desired working life for commercial operation and a full quota of latent or potential waterproofing agent in order to produce the full waterproofing effect, to increase the working life of the glues of the type referred to, to increase the dry strengths of the glue lines in completed panels made with such glues, to increase the wet strengths of such glue lines, and other objects will be apparent on reading this specification.

Prior glues of this type, which I improve by the use of this invention, contained a minimum of about two (2) parts by weight of water to one (1) of casein, up to a maximum of about three (3) parts by weight of water to one (1) of casein. In such compositions the presence of an amount of sodium formaldehyde bisulphite equal to more than one percent (1%) by weight of the casein present made the working life too short for operation on a commercial scale under industrial conditions. This applied to the glue that was in the glue pot before it was spread on a wood ply; and after it was so applied to a wood ply the time was even shorter in which the glue set. Thus, with the use of these prior glues, either the working life or the waterproofing effect was insufficient. It was not possible to have both of the desired degree.

I have discovered how it is possible to have both waterproofing effect and working life greater than was previously possible, and that such results are made possible by increasing the proportion of water to casein. This increase in the proportion of water permits of an increase in the proportion of latent or potential waterproofing agent (additive aldehyde compound). The waterproofness of the final product may thus be increased without making the glue too thick or the working life too short, and at the same time less casein is required for the same bonding effect.

A good working range for the ratio of water to casein is to have the weight of the water equal to four (4) to seven (7) times the weight of the casein, it being understood that a ratio somewhat below or above this range is still within the scope of this invention. If milk casein is put in solution in aqueous alkaline medium, using most any of the common alkaline solvents used commercially in casein adhesives, the aqueous medium being more than four (4) times by weight the weight of the protein of the adhesive, I can use enough of an additive aldehyde compound to gain greater water resistance, considerably more than was previously possible, and still maintain the glue in fluid condition for a long period of time. I have discovered that an amount of sodium formaldehyde bisulphite may be present in such glues under the conditions just mentioned, which is equal to from four percent (4%) to seven percent (7%) of the amount of the casein therein by weight, and with the larger proportion of additive aldehyde compounds greater water resistance may be obtained. Aldehyde sulphoxylates, aldehyde ammonias, acetaldehyde bisulphite, benzaldehyde bisulphite, and other equivalents may be used in place of the sodium formaldehyde bisulphite. In the past, small amounts, such as one-half of one percent (½%) to two percent (2%), of sodium formaldehyde bisulphite compound have been introduced into glues to increase water resistance, but where more than one percent (1%) of this compound was used, a glue of such short working life resulted that it was not commercial. My discovery makes it possible, for example, where four (4) parts of water by weight to one (1) part of casein by weight are present in the solution, along with sodium hydroxide or other alkalis commonly known to the glue trade, to have present an amount of sodium formaldehyde bisulphite equal to from two and three-quarters percent (2¾%) to three percent (3%) of the weight of the casein present; and where six (6) parts of water are used with one (1) part of casein by weight, to have present an amount of sodium formaldehyde bisulphite equal to five and three-quarters percent (5¾%) to six percent (6%) of the weight of the casein present; and the glue in both instances has a very desirable consistency, a commercially useful working life, and unusually great water resistance. I have made glues using as much as seven and one-half (7½) parts of water by weight to one (1) part of protein by weight and introduced as much sodium formaldehyde bisulphite as seven percent (7%) of the weight of the casein present, obtaining a glue of high strength and unusual water resistance, and of very good body in a commercially fluid state.

One of the very important factors to be noted is that as the water dilution is increased, the amount of the additive aldehyde component may be increased, with very little, if any, change in the body of the glue as measured on a viscosimeter or in the strength of the resultant glue lines, while the cost of the glue line per thousand square feet of panels is reduced in almost direct proportion because much less casein is required for a given result. I thus obtain improved results per pound of casein used. A casein glue made according to my invention can be produced to compete on a price basis per thousand square feet of panel glue cost with the cheap glues that are not so highly water resistant as these casein glues, such as cassava starch, and the vegetable protein containing adhesives such as soya bean meal, peanut meal, cottonseed meal, castor meal and the like. On numerous plant scale runs I have used as little as fourteen pounds (14 lbs.) of casein per thousand square feet of three-ply panels, while a starch glue necessitates the use of forty pounds (40 lbs.) of starch per thousand square feet of panel, and the soya bean or other vegetable seed residue glues require that twenty-seven pounds (27 lbs.) or more of that glue must be used per thousand square feet of three-ply panels. As compared to prior casein glues, my new type of glue requires only from three-fifths (3/5) to three-eighths (3/8) as much casein as do such prior glues. Although casein is comparatively expensive, my invention makes it possible to use it in competition with cheaper materials although charging twice as much per pound for my higher priced base.

Examples of glues made according to my invention are:

| | Pounds |
|---|---|
| Milk casein | 100 |
| Hydrated lime | 25 |
| Silicate of soda 40° Bé | 65 |
| Water | 400 |
| Sodium formaldehyde bisulphite | 2.93 |

| | Pounds |
|---|---|
| Milk casein | 100 |
| Hydrated lime | 25 |
| Silicate of soda 40° Bé | 65 |
| Water | 500 |
| Sodium formaldehyde bisulphite | 4.55 |

| | Pounds |
|---|---|
| Milk casein | 100 |
| Hydrated lime | 25 |
| Silicate of soda 40° Bé | 65 |
| Water | 600 |
| Sodium formaldehyde bisulphite | 5.9 |

| | Pounds |
|---|---|
| Milk casein | 100 |
| Hydrated lime | 20 |
| Caustic soda | 5 |
| Silicate of soda 40° Bé | 60 |
| Water | 500 |
| Sodium formaldehyde bisulphite | 4.50 |

It is understood that potassium hydroxide or ammonium hydroxide or other equivalents may be substituted for the sodium hydroxide in equivalent amounts. Other alkaline earth hydroxides may be substituted for the calcium hydroxide or lime.

Prior glues of the type described, that is glues containing the protein and the latent aldehyde, which glues generally also contain an alkaline medium, have been unsatisfactory because the reaction between the protein and the latent aldehyde takes place too soon and does not permit of a sufficiently long working life for commercial operation. The balanced water-casein-additive aldehyde compound combination made according to my invention has the function of retarding or buffering this reaction to a degree which results in the desired working life, and thereby makes available for commercial use a type of glue without its previous disadvantages. Without the balanced water-casein-additive aldehyde compound it was necessary to adjust commercial operations to suit the glue, and such adjustment resulted in working conditions which did not permit of economical production if the full waterproofing effect was desired. The result was that where an additive aldehyde compound was used in combination with milk casein, it was necessary to hold down the proportion of the additive aldehyde compound to such an extent that the full waterproofing effect on the protein was not achieved. The use of the balanced water-casein-additive aldehyde compound combination in accordance with my invention has the effect of retarding or buffering the waterproofing reaction in such a manner that the full quota of latent, potential waterproofing agent may be present without shortening the working life of the glue to a point where it is not desirable for commercial operation. In other words, the additional proportion of water lengthens the working life while producing the desired glue bond, and my balanced water-casein-additive aldehyde compound combination results in adjusting the glue characteristics so that they fit in with economical working conditions.

While the components of the glue may be mixed together in any suitable manner, I usually prefer to ship the protein and lime separately and mix at the consumer plant, where water and the chosen alkaline and possibly other materials are added to the mixture.

As a specific example demonstrating the advantages to be derived by using this invention, I refer to a commonly used commercial method of manufacturing multi-ply wood panels and again to the prior glues of the type to which this invention relates. In this method of manufacture, say of three-ply panels, the plies which are to be the inner ones are passed between rollers to which the glue is fed, and the rollers thereby apply the glue to both sides of such plies. These are assembled between the plies which are to be on the outside and to which glue is ordinarily not applied except by contact with the inner plies which carry glue. The assemblies should be under pressure at the time that the glue sets, in order to make the glue bond of maximum strength, and this pressure must be applied within a certain time. The working life is a factor which determines the maximum period of time within which the pressure must be applied. The usual procedure is to press a stack or package of such assemblies or panels in a press and to leave the whole stack under pressure until after the glue has set in all of the assemblies. The assemblies are built up and stacked one after another, and thus a considerable period of time elapses between assembling the first and the last one of a stack. This period of time must be less than the working life of the glue because a glue cannot be used for sticking things together after expiration of its working life. The prior glues over which this invention is an improvement, as stated above, comprise two (2) to three (3) parts by weight of water to one (1) of the casein. The maximum amount of sodium formaldehyde bisulphite that can be present therein is about one percent (1%) by weight of the casein, and even with this small amount the glue is too short-lived to be satisfactory. The working life of the glue in the glue pot is too short even before it is spread on the wood plies, while after being spread thereon, the working life is still shorter. When using such prior glues, it is necessary to apply the pressure within fifteen (15) minutes of assembling the first panel (the one at the bottom of the stack) in order to develop the proper adhesion therein. This restricts the size of the stack too much for economic commercial production which requires at least a thirty (30) minute period of time for assembling the stack. By the use of my invention, I can produce the required strong glue bond of the required water resistance without limiting the period of time for assembling the stack below that required for commercial operation.

For commercial reasons I prefer sodium formaldehyde bisulphite as the means for increasing the water resistance of the glue line, and for that reason I have referred to it for the purpose of describing the invention. It is to be understood, however, that equivalents thereof may be used and that the claims are intended to cover such equivalents even though they may refer only to the specific compound.

While I have referred to certain details in describing my invention, these may be varied without departing from the spirit thereof.

I claim:

1. A wood veneer casein glue having the desired body and working life, adapted to form a bond of the desired strength and water resistance, and comprising an admixture of an aqueous alkaline medium, isolated milk casein and sodium formaldehyde bisulphite, as separate ingredients, the amount of the water being at least four (4) times the amount of the casein by weight, whereby the amount of said sodium formaldehyde bisulphite may be at least about two and three-quarters percent (2¾%) to three percent (3%) of the amount of casein by weight.

2. A wood veneer casein glue having the desired body and working life, adapted to form a bond of the desired strength and water resistance, and comprising an admixture of an aqueous alkaline medium, isolated milk casein and sodium formaldehyde bisulphite, as separate ingredients, the amount of the water being about four (4) times the amount of the casein by weight, whereby the amount of sodium formaldehyde bisulphite may be up to about two and three-quarters percent (2¾%) to three percent (3%) of the amount of casein by weight.

3. A wood veneer casein glue having the desired body and working life, adapted to form a bond of the desired strength and water resistance, and comprising an admixture of an aqueous alkaline medium, isolated milk casein and sodium formaldehyde bisulphite, as separate ingredients, the amount of the water being at least seven (7) times the amount of the casein by weight, whereby the amount of sodium formaldehyde bisulphite may be at least about five and three-quarters percent (5¾%) to six percent (6%) of the amount of casein by weight.

4. A wood veneer casein glue having the desired body and working life, adapted to form a bond of the desired strength and water resistance, and comprising an admixture of an aqueous alkaline medium, isolated milk casein and sodium formaldehyde bisulphite, as separate ingredients, the amount of the water being about seven (7) times the amount of the casein by weight, whereby the amount of said sodium formaldehyde bisulphite may be up to about five and three-quarters percent (5¾%) to six percent (6%) of the amount of casein by weight.

5. A wood veneer casein glue having the desired body and working life, adapted to form a bond of the desired strength and water resistance, and comprising an admixture of an aqueous alkaline medium, isolated milk casein and sodium formaldehyde bisulphite, as separate ingredients, the amount of the water being about four to seven (4 to 7) times the amount of the casein by weight, whereby the amount of said sodium formaldehyde bisulphite may be up to about three to six percent (3% to 6%) of the amount of casein by weight.

GEORGE H. OSGOOD.